United States Patent
Abudul Muthalib et al.

(10) Patent No.: US 7,643,263 B2
(45) Date of Patent: Jan. 5, 2010

(54) CONTROLLING OVER-CURRENT FROM A POWER SUPPLY TO A DEVICE

(75) Inventors: Nasrudin Abudul Muthalib, Penang (MY); Macwien Krishnamurthi Annamalai, Selangor (MY); Jaya Rao, Perlis (MY)

(73) Assignee: Motorola, Inc., Schaumburg, IL (US)

( * ) Notice: Subject to any disclaimer, the term of this patent is extended or adjusted under 35 U.S.C. 154(b) by 341 days.

(21) Appl. No.: 11/835,526

(22) Filed: Aug. 8, 2007

(65) Prior Publication Data

US 2009/0040675 A1    Feb. 12, 2009

(51) Int. Cl.
*H02H 3/08* (2006.01)
(52) U.S. Cl. .......................................... 361/93.1; 361/87
(58) Field of Classification Search .................... 361/87, 361/93.1, 93.2, 93.3, 93.9
See application file for complete search history.

(56) References Cited

U.S. PATENT DOCUMENTS

| | | | |
|---|---|---|---|
| 6,385,547 B1 * | 5/2002 | Bogli | 702/64 |
| 6,806,446 B1 * | 10/2004 | Neale | 219/497 |
| 7,532,448 B2 * | 5/2009 | So | 361/93.9 |
| 7,576,525 B2 * | 8/2009 | So et al. | 323/276 |
| 2007/0241802 A1 * | 10/2007 | Kocaman et al. | 327/307 |

FOREIGN PATENT DOCUMENTS

JP    06070444 A  *  3/1994

* cited by examiner

*Primary Examiner*—Ronald W Leja
*Assistant Examiner*—Christopher J Clark
(74) *Attorney, Agent, or Firm*—Simon B. Anolick; Anthony P. Curtis

(57) ABSTRACT

Apparatus (230) for controlling over-current from a power supply (110) to a device (250), the apparatus comprising two power supply inputs (232a, 232b) and two respective device outputs (234a, 234b), a control circuit (120) having control inputs (126x, 126y) connected across a variable resistance circuit (240) coupled between a said power supply input (232a) and a said respective device output (234a), the control circuit arranged to disconnect one of the power supply inputs (232a) from the respective device output (234a) in response to detecting a predetermined over-current voltage across the variable resistance circuit (240), the resistance of the variable resistance circuit (240) being varied dependent on an over-current setting signal (270) received from the device (250).

9 Claims, 3 Drawing Sheets

CONTROLLING OVER-CURRENT FROM A POWER SUPPLY TO A DEVICE

FIELD OF THE INVENTION

The present invention relates generally to the field of power supplies and in particular the control of over-current in a battery powered electronic device.

BACKGROUND OF THE INVENTION

A fundamental requirement for any electronic device is over-current protection. Over-current is the condition where the current is greater than that rated for the device, for example due to an overload, short circuit or ground fault. As the level of current required for an over-current condition will vary according to the device, over-current protection is typically designed specifically for each device. However this can be problematic in devices which have more than one mode of operation, for example in radio devices having transceivers with different power levels.

Batteries suitable for devices such as radio communications devices typically incorporate protection mechanisms for over-current, in-rush current, and over temperature; for example in a specialised chip or integrated circuit. Thus it can be costly to modify such batteries for use with different types of devices having different over-current and other protection parameters. Similarly, such batteries may not be suitable for use with device which are capable of operating in multiple power modes; for example radio communications devices having multiple transceivers with differing power requirements.

BRIEF DESCRIPTION OF THE DRAWINGS

In order that the invention may be readily understood and put into practical effect, reference will now be made to an exemplary embodiment as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where.

Figure 1:
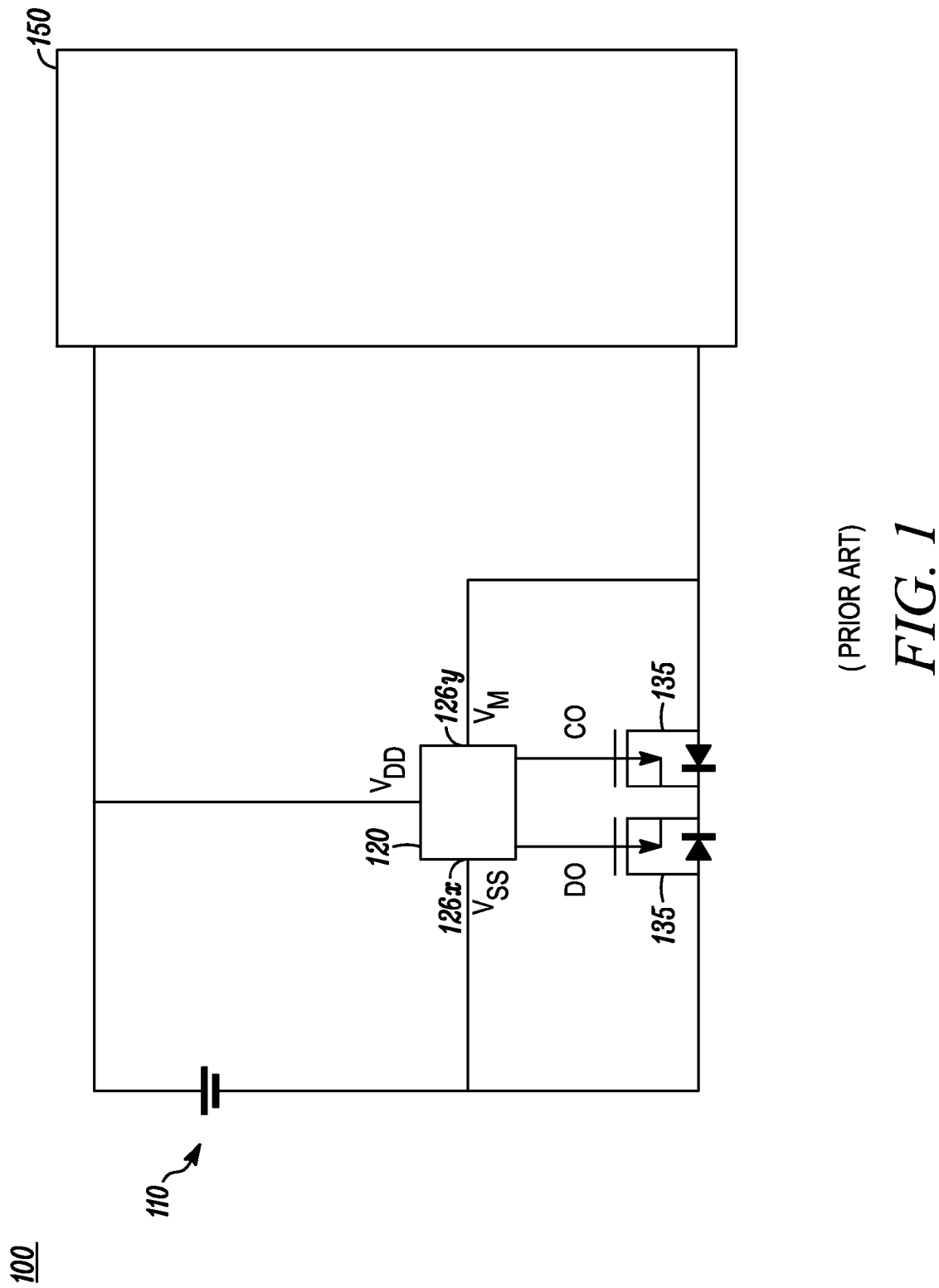
FIG. 1 is a schematic block diagram illustrating a battery powered electronic device with over-current control according to the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to controlling over-current from a power supply to a device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the method, or apparatus that comprises the element.

Methods and means for the function of controlling over-current from a power supply to a device have been described herein. Further, it is expected that one of ordinary skill, notwithstanding possibly significant effort and many design choices motivated by, for example, available time, current technology, and economic considerations, when guided by the concepts and principles disclosed herein will be readily capable of generating alternative means and methods to those described herein.

Referring to FIG. 1, there is shown a schematic diagram illustrating a battery powered electronic device with known over-current control. A battery 110 together with a control circuit 120 and two field effect transistors 135 together form a battery package 110, 120, 135 which is connected to a device 150 such as a mobile phone or two-way radio for example. The battery 110 is typically a LiIon (Lithium Ion) battery although any suitable battery type may be used. The control circuit 120 is typically in the form of an integrated circuit which includes over-current, short circuit, and battery temperature monitoring functions.

The two FETs 135 DO and CO are controlled by the control circuit 120 to open and isolate the battery 110 in response to specific over-current, short-circuit or over temperature conditions. For example DO is opened when an over-current condition is detected, and CO is opened when a short-circuit condition is detected. These conditions are detected by monitoring the voltage (Vm−Vss) across the two FETs 135. Because the resistance or conductance of the ON or conductance state of these two FETs 135 are known, the current flowing from the battery 110 to the device 150 can be inferred from the voltage measurement across the two FETs 135.

The control circuit 120 is powered from the positive battery terminal having voltage Vdd and includes two control inputs 126x and 126y. One of the control inputs 126y measures the voltage Vm on one side of the two FETs 135, and the other control input 126x measures the voltage Vss on the other side of the two FETs 135 and at the negative battery terminal. In response to detecting a predetermined elevated over-current voltage Vm−Vss for a predetermined period, an over-current condition is inferred by the control circuit 120, and one of the two FETs 135 DO is opened to isolate the battery 110 from the device 150. This predetermined over-current voltage corresponds to the rated over-current for the device 150 flowing through the two FETs 135 in their ON, closed or conductance state. Similarly, in response to detecting another predetermined short circuit voltage Vm−Vss (usually higher) for a different predetermined time (usually shorter), a short circuit condition is inferred by the control circuit 120, and the other FET 135 CO is opened. An example control circuit 120 is the S8242B from Seiko Instruments.

However as the control circuit 120 is specifically designed for each type of device 150, with different over-current, short circuit and/or other protection parameters, it is generally not suitable to use the battery package 110, 120, with different types of device 150 as they may have different over-current ratings for example. Furthermore, when designing a new battery package 110, 120, 135 the over-current rating may only be available when the device design is at a mature level. Optimisation of the over-current rating may require a layout or piece part change which further prolongs the battery design time. Further the battery package will typically be designed based on worst case operating conditions, and may not allow minor subsequent optimisation.

Figure 2:
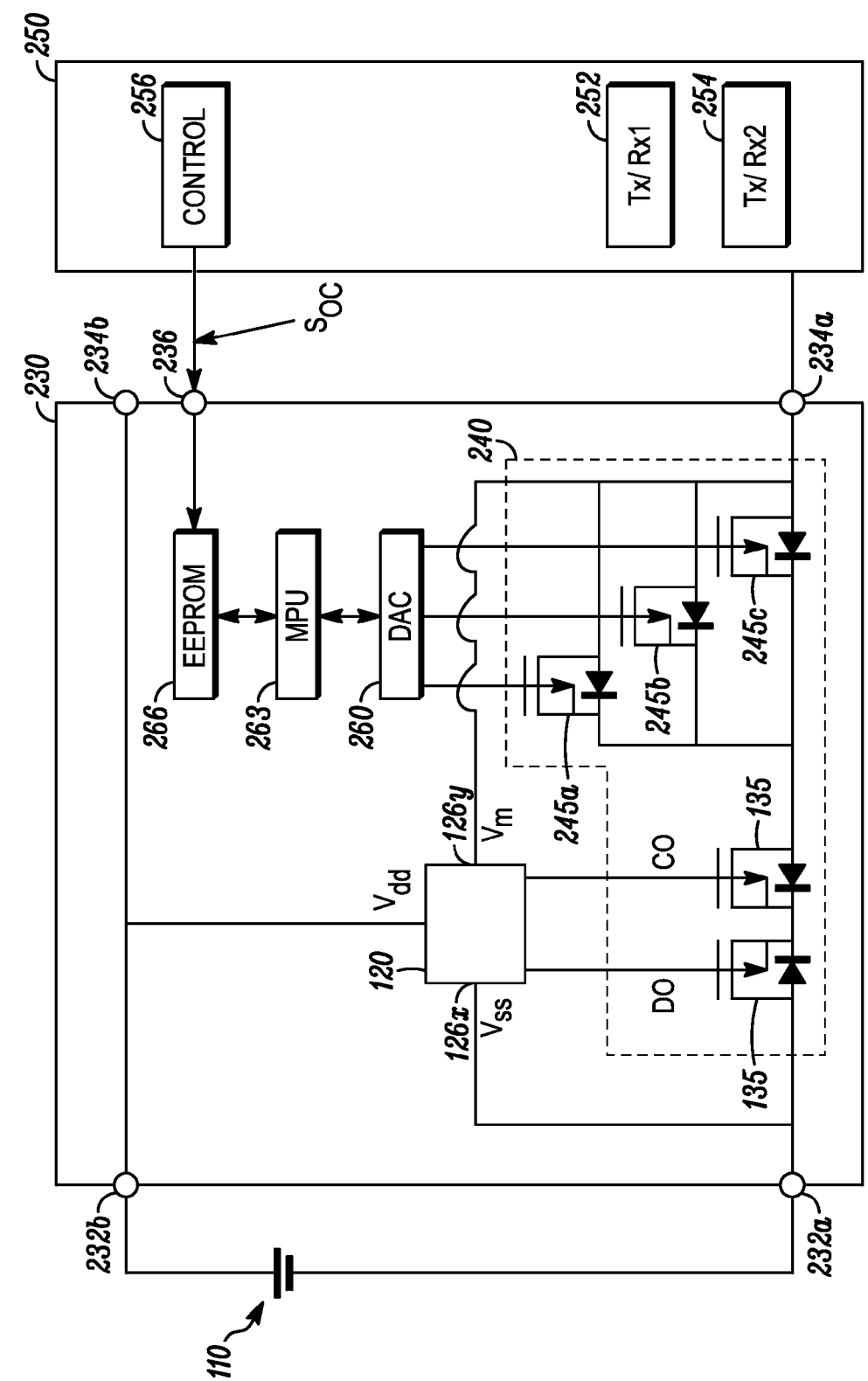
FIG. 2 is a schematic block diagram illustrating circuitry for an apparatus for controlling over-current from a power supply to a device in accordance with the invention.

FIG. 2 is a schematic block diagram illustrating circuitry for an apparatus for controlling over-current from a power supply to a device in accordance with the invention. A battery system 200 comprises a battery 110, and a device 250 which is coupled to the battery 110 through the apparatus for controlling over-current 230. The battery in this embodiment is a LiIon battery 110 which incorporates the apparatus 230 into a battery package which can be connected to one or more different types of device 250. The device 250 in the embodiment is a two-way radio having two transceivers 252 and 254 together with a control block 256. The two transceivers 252 and 254 have different power requirements and therefore different over-current ratings will be appropriate for the device 250 depending on which transceiver 252 or 254 is operating. In alternative embodiments, a different radio communications device with only a single transceiver may be used, but which again requires a different over-current rating. In further embodiments, other electronic devices which are not radio communications devices may be used.

The apparatus for controlling over-current 230 comprises two power supply inputs 232a and 232b which are connected to the battery 110 within an integrated battery package. The apparatus 230 also comprises two respective device outputs 234a and 234b for connecting to a device 250, and an apparatus signal connection 236 for receiving an over-current setting signal $S_{oc}$ from the device 250. The apparatus 230 further comprises a control circuit 120, two control semiconductor devices in the form of the two FETs 135 (DO and CO), a variable resistance circuit 240, a digital-to-analog converter (DAC) 260, a processor 263 and a memory 266.

The control circuit 120 may be any suitable over-current protection device triggered by a predetermined voltage level such as the S8242B from Seiko Instruments. The control circuit 120 has two control inputs 126x and 126y connected across the variable resistance circuit 240 which is coupled between one of the power supply inputs 232a and the respective device output 234a. The control circuit 120 is arranged to disconnect one of the power supply inputs 232a from the respective device output 234a in response to detecting a predetermined over-current voltage across the variable resistance circuit 240. This is implemented by opening one of the control semiconductor devices or FETs 135 DO in response to detecting that the voltage difference Vm−Vss across its control inputs 126x and 126y is the predetermined over-current voltage. This predetermined over-current voltage may be a range of voltages, for example above a set voltage threshold.

The variable resistance circuit 240 comprises the two control semiconductor devices or FETs 135 which are typically FETs, together with a plurality of over-current setting semiconductor devices 245a, 245b, 245c connected in parallel. The over-current setting semiconductor devices 245a-245c are typically also FETs, and may be arranged into different circuit configurations such as serial or a combination of serial and parallel connections. By controlling whether the various over-current setting semiconductor devices 245a-245c are on or off, or in some embodiments partially on, the resistance of the variable resistance circuit 240 can be varied.

The individual over-current setting semiconductor devices 245a-245c have their respective resistances varied by respective outputs from the DAC 260. Thus, the respective resistances are varied dependent on the over-current setting signal $S_{oc}$ received from the device. In the embodiment illustrated a simple three output DAC 260 is shown, however various alternative DAC could be used with different numbers and/or circuit configurations of over-current setting semiconductor devices 245a-245c. Indeed, various combinations of the DAC outputs could be used to control different over-current setting semiconductor devices. As is known, the DAC will output a combination of high and low voltages at its analog outputs dependent on the digital input it receives. Thus each of a number of digital inputs received by the DAC 260 will correspond to a particular combination of over-current setting semiconductor devices 245a-245c being on and off. This in turn results in corresponding resistance values of the variable resistance circuit 240. Thus the resistance of the variable resistance circuit 240 is dependent on the digital input or a digital resistance setting value provided to the DAC 260 by the processor 263.

The processor 263 may be any suitable microprocessor unit (MCU) which may form another part of the battery package (110, 120, 135, 245a-245c, 260, 263, 266), for example a coulomb counter integrated circuit for monitoring battery life or available charge levels. The processor 263 interrogates the memory 266 for a digital value corresponding to the connected device 250. The memory 266 may be any suitable memory such as an electrically erasable programmable read only memory (EEPROM). The processor 263 periodically monitors the signal connection 236 for an over-current setting signal $S_{oc}$ from the connected device 250. The over-current setting signal is then processed according to an algorithm within the EEPROM 266 in order to generate the digital resistance setting value for setting the DAC 260. This digital resistance setting value is device 250 dependent and is stored in the EEPROM 266 by the processor 263, and also provided to the DAC 260 in order to set the resistance of the variable resistance circuit 240. Thus the resistance of the variable resistance circuit 240 is varied dependent on the over-current setting signal $S_{oc}$ received from the device 250.

As the resistance of the variable resistance circuit 240 is varied, the current flowing through the variable resistance circuit 240 required to generate the predetermined over-current voltage across the control inputs 126x, 126y of the control circuit 120 also varies. This allows the same control circuit 120 with its predetermined over-current voltage to be used to provide over-current protection for different devices which have different over-current ratings. Thus for example, if a device 250 having a high over-current rating is connected, a low resistance setting for the variable resistance circuit 240 may be used; thus requiring a larger current flowing through the variable resistance circuit to provide the predetermined over-current voltage of the control circuit 120. By comparison, when a device 250 having a lower over-current rating is connected, a high resistance setting for the variable resistance circuit 240 may be used; thus requiring a lower current flowing through the variable resistance circuit to provide the same predetermined over-current voltage of the control circuit 120.

This arrangement allows devices 250 having different over-current ratings to be connected to the same battery package 110, 230. The device 250 however needs to provide a predetermined over-current setting signal $S_{oc}$ to the apparatus 230 indicating its over-current rating. The over-current setting signal may be any suitable electrical signal, such as an analog voltage level, or a digital message. Alternatively a mechanical arrangement of pins or some other means of indicating the over-current rating may be provided and which inter-engages with the apparatus signal connection 236 in a predetermined way. Similarly, a single device 250 may provide a number of different over-current setting signals $S_{oc}$ depending on its mode of operation. For example the over-current setting signals $S_{oc}$ may be different when the device switches from using one transceiver 252 to using a different transceiver 254. The control block 256 may be any suitable logic, other circuit or programmed processor which provides the over-current setting signals $S_{oc}$. This may be static, or it may change depending on operation of the device 250.

Figure 3:
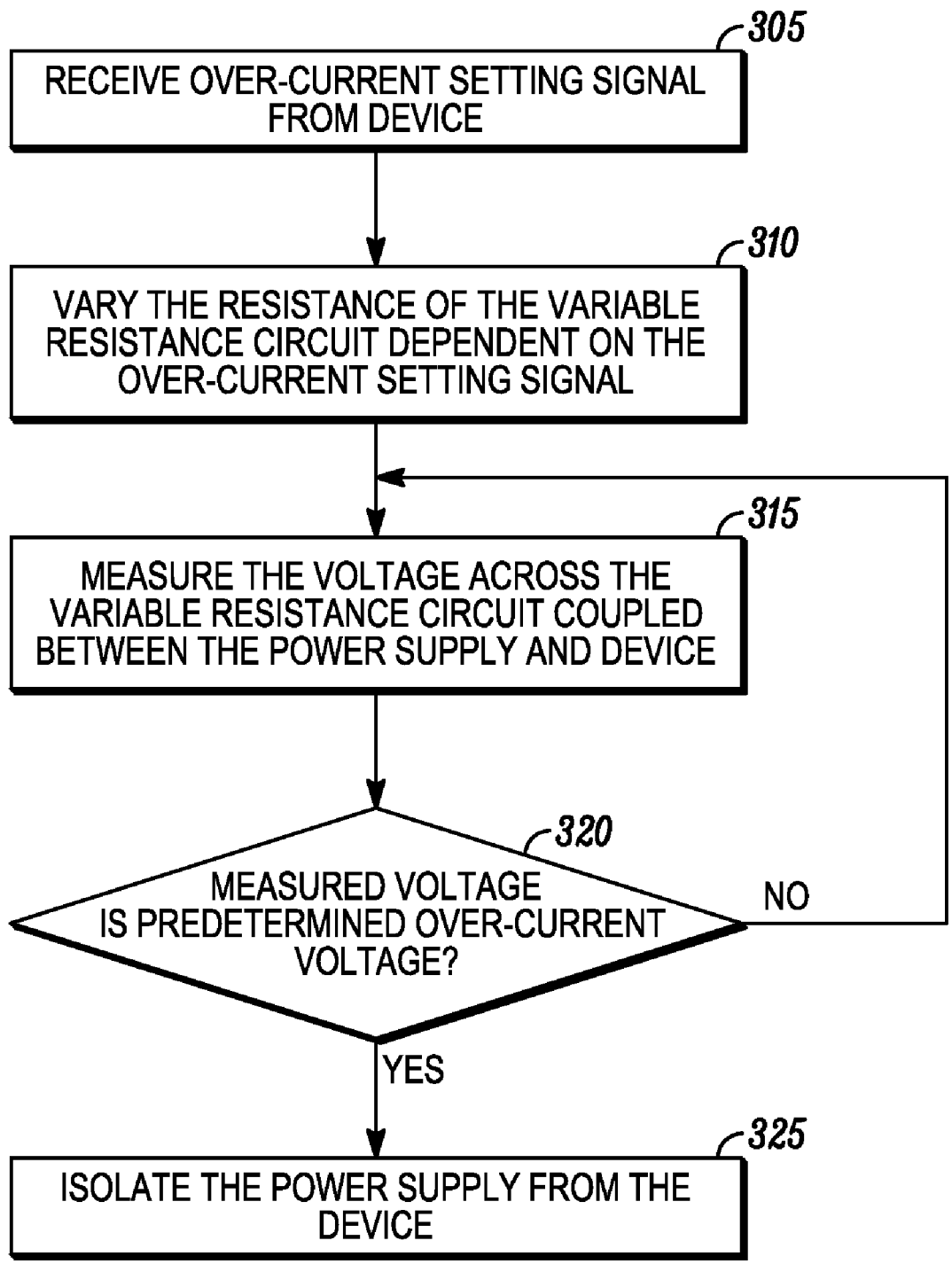
FIG. 3 illustrates a method of operating the apparatus for controlling over-current of FIG. 2.

FIG. 3 illustrates a method for controlling over-current between a power supply and a device using the apparatus 230 of FIG. 2. The method 300 initially receives an over-current setting signal $S_{oc}$ from the device at step 305. This step is implemented by the processor 263 monitoring the signal connection 236, and processing the over-current setting signal $S_{oc}$ received from the device 250 to generate the digital resistance setting value which is stored in the EEPROM 266. The method 300 then varies the resistance of the variable resistance circuit 240 dependent on the over-current setting signal $S_{oc}$ at step 310. This step is implemented by the processor 263 inputting the digital resistance setting value into the DAC 260 which in turn outputs a corresponding analog value using high and low voltage combinations on its analog outputs. These high and low outputs switch corresponding over-current setting semiconductor devices 245, 245b, 245c on or off which in turn varies the combined resistance of the variable resistance circuit 240.

The method 300 then measures the voltage across the variable resistance circuit 240 coupled between the power supply 110 and device 250 at step 315. This step is implemented by the control circuit 120 monitoring the voltage Vm–Vss across its control inputs 126x(Vss) and 126y (Vm). The method 300 then determines whether the measured voltage Vm–Vss is the predetermined over-current voltage at step 320. This step is implemented by the control circuit 120 determining whether the measured voltage is greater than a threshold voltage corresponding to an over-current rating or setting. If the measured voltage is not the predetermined over-current voltage (320N), then the method returns to measuring the voltage across the variable resistance circuit 240 at step 315. If however the measured voltage is the predetermined over-current voltage (320Y), then the method 300 isolates the power supply 110 from the device 250 at step 325. This step is implemented by the control circuit 120 controlling one of the control semiconductor devices or FETS 135 DO to open, thus preventing current flowing from the battery 110 to the device 250.

As previously described, this arrangement advantageously allows a fixed battery 110 and control circuit 120 combination within a battery package 110, 120, 230 to be used for a number of different devices 250 with different over-current ratings. It may also be used in devices such as two-way radio devices that can operate in multiple modes which require different over-current ratings; for example using different transmitters.

Whilst the embodiments have been described with respect to LiIon battery packages, they may also be applied to other battery types, as well as other types of power supplies including mains supplies. Similarly, different variable resistance circuits could be used, for example networks of fixed resistances and switches. Also the particular arrangement of DAC 260, processor 263, and EEPROM 266 could be varied as would be appreciated by those skilled in the art. Similarly, different control circuits 120 could be employed in alternative embodiments. In yet further embodiments, the variable resistance circuit 240 need not include the control semiconductor devices OR FETs 135, and these may be located between the other power supply input 232b and respective device output 234b.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims.

We claim:

1. Apparatus for controlling over-current from a power supply to a device, the apparatus comprising:
   two power supply inputs and two respective device outputs;
   a control circuit having control inputs connected across a variable resistance circuit coupled between a said power supply input and a said respective device output, the control circuit arranged to disconnect one of the power supply inputs from the respective device output in response to detecting a predetermined over-current voltage across the variable resistance circuit;
   the resistance of the variable resistance circuit being varied dependent on an over-current setting signal received from the device.

2. Apparatus for controlling over-current as claimed in claim 1, wherein the variable resistance circuit comprises a plurality of over-current setting semiconductor devices connected in parallel and having respective resistances varied dependent on the over-current setting signal received from the device.

3. Apparatus for controlling over-current as claimed in claim 2, further comprising a digital-to-analog converter (DAC) having analog outputs each connected to a respective said over-current setting semiconductor device, the voltages at the outputs of the DAC being dependent on the over-current setting signal received from the device.

4. Apparatus for controlling over-current as claimed in claim 3, further comprising a processor and memory arranged to receive the over-current setting signal from the device and in response to output a digital value to the DAC dependent on the over-current setting signal.

5. Apparatus for controlling over-current as claimed in claim 2, wherein the variable resistance circuit further comprises a control semiconductor device controlled by the control circuit and arranged to disconnect a first said power supply input from a first said device output in response to detecting the predetermined over-current voltage across the variable resistance circuit.

6. A battery system for supplying a device and comprising:
a battery;
two power supply inputs coupled to the battery and two respective device outputs;
a control circuit having control inputs connected across a variable resistance circuit coupled between a said power supply input and a said respective device output, the control circuit arranged to disconnect one of the power supply inputs from the respective device output in response to detecting a predetermined over-current voltage across the variable resistance circuit;
the resistance of the variable resistance circuit being varied dependent on an over-current setting signal received from the device.

7. Battery system as claimed in claim 6, wherein the device is a radio communications device and the over-current setting signal is dependent on the type of radio communications device connected to the battery.

8. A method for controlling over-current between a power supply and a device, the method comprising:
measuring a voltage across a variable resistance circuit coupled between the power supply and the device;
varying the resistance of the variable resistance circuit dependent on an over-current setting signal received from the device;
isolating the power supply from the device in response to detecting a predetermined over-current voltage across the variable resistance circuit.

9. A method for controlling over-current between a power supply and a device as claimed in claim 8, wherein the power supply is a battery and the device is a radio communications device.

* * * * *